United States Patent
Othmezouri et al.

(10) Patent No.: US 11,218,034 B2
(45) Date of Patent: Jan. 4, 2022

(54) METHOD OF ALIGNING ELECTRONIC CIRCUITS AND ELECTRONIC ALIGNMENT SYSTEM

(71) Applicants: TOYOTA MOTOR EUROPE, Brussels (BE); TEADE AB, Lindome (SE)

(72) Inventors: Gabriel Othmezouri, Brussels (BE); Harald Merkel, Lindome (SE)

(73) Assignees: TOYOTA MOTOR EUROPE, Brussels (BE); TEADE AB, Lindome (SE)

(*) Notice: Subject to any disclaimer, the term of this patent is extended or adjusted under 35 U.S.C. 154(b) by 97 days.

(21) Appl. No.: 16/489,053

(22) PCT Filed: Feb. 28, 2017

(86) PCT No.: PCT/EP2017/054671
§ 371 (c)(1),
(2) Date: Aug. 27, 2019

(87) PCT Pub. No.: WO2018/157917
PCT Pub. Date: Sep. 7, 2018

(65) Prior Publication Data
US 2020/0014253 A1 Jan. 9, 2020

(51) Int. Cl.
*H02J 50/90* (2016.01)
*H02J 50/12* (2016.01)
*H02J 50/05* (2016.01)
*H02J 50/50* (2016.01)

(52) U.S. Cl.
CPC .............. *H02J 50/90* (2016.02); *H02J 50/05* (2016.02); *H02J 50/12* (2016.02); *H02J 50/50* (2016.02)

(58) Field of Classification Search
None
See application file for complete search history.

(56) References Cited

U.S. PATENT DOCUMENTS

| | | | |
|---|---|---|---|
| 645,576 | A | 3/1900 | Tesla |
| 7,825,543 | B2 | 11/2010 | Karalis et al. |
| 2008/0278264 | A1 | 11/2008 | Karalis et al. |
| 2013/0015699 | A1 | 1/2013 | Mita |
| 2013/0249299 | A1 | 9/2013 | Shijo et al. |
| 2014/0070622 | A1 | 3/2014 | Keeling et al. |
| 2015/0155095 | A1 | 6/2015 | Wu et al. |

(Continued)

FOREIGN PATENT DOCUMENTS

WO 2014/099737 A1 6/2014

OTHER PUBLICATIONS

International Search Report for PCT/EP2017/054671 dated, Dec. 4, 2017.

(Continued)

*Primary Examiner* — Jared Fureman
*Assistant Examiner* — Aqeel H Bukhari
(74) *Attorney, Agent, or Firm* — Sughrue Mion, PLLC (57) ABSTRACT

The present disclosure relates to a method of aligning a set of objects, the method comprising the steps of: providing each object with at least one resonant circuit, the resonant circuits having at least one resonance frequency, and aligning the objects until a field coupling between the resonant circuits reaches a predetermined value. The disclosure further relates to an electronic alignment system.

22 Claims, 10 Drawing Sheets

(56) References Cited

U.S. PATENT DOCUMENTS

2015/0371771 A1    12/2015  Abu Qahouq
2016/0164345 A1*   6/2016   Sankar .................... H02J 50/12
                                                    307/104
2016/0238731 A1*   8/2016   Chopra ................ B60L 53/122

OTHER PUBLICATIONS

Written Opinion of the International Searching Authority for PCT/EP2017/054671 dated, Dec. 4, 2017.

* cited by examiner

METHOD OF ALIGNING ELECTRONIC CIRCUITS AND ELECTRONIC ALIGNMENT SYSTEM

CROSS REFERENCE TO RELATED APPLICATIONS

This application is a National Stage of International Application No. PCT/EP2017/054671 filed Feb. 28, 2017.

FIELD OF THE DISCLOSURE

The present disclosure is related to a method of aligning electronic circuits and to electronic alignment systems.

BACKGROUND OF THE DISCLOSURE

Conventional mechanical alignment requires fitting pins and grooves. Only two dimensional alignment is possible. The achieved accuracy is not sufficient for optical systems.

As an alternative optical alignment is possible, However, such procedures require optical transparent materials.

Furthermore resonant coupling technologies are known, e.g. from U.S. Pat. No. 645,576 A (Tesla, 1900).

U.S. Pat. No. 7,825,543 (Karalis, 2010) discloses wireless power transfer coupling to be maximum at certain predetermined relative positions, usage of non-radiating fields.

WO2014099737 A1 (Lafontaine, 2014) discloses method to optimize wireless power transfer i.e. resonant coupling using signal modulation.

US20150371771 A1 (Abu Jahouq, 2015) discloses a mechanical adjustment of the resonant circuit to optimize the power transfer efficiency.

SUMMARY OF THE DISCLOSURE

Currently, it remains desirable to provide a technology for an accurate alignment of objects.

Therefore, according to embodiments of the present disclosure, a method of aligning a set of objects is provided, the method comprising the steps of: providing each object with at least one resonant circuit, the resonant circuits having at least one resonance frequency, and aligning the objects until a field coupling between the resonant circuits reaches a predetermined value.

Accordingly, the present disclosure offers a way of electromagnetic alignment which is accurate, suitable for 3D and works in dielectric materials. When aligned, the markers (resonant circuits) can be used as wireless power transfer ports.

In other words, electromagnetic resonant circuits may be placed on circuits that must be aligned relative to each other. The circuits may be placed by design that the coupling of the resonances reaches a maximum when mechanical alignment is reached.

The present disclosure can be applied to align more than two parts at the same time using multiple resonant circuits. The present disclosure may be used to group all alignment electronics on one part of the system.

More than one set of resonantly coupled circuit may be used simultaneously.

The mechanical conductor structure of the resonant circuit is not restricted to loops or coils. The only desirable requirement is that the conductor offers an almost closed inner surface. The gap where the conductor is almost closed serves as capacitive element, the conductor may serve as the inductor. The resonance frequency of the structure may be tuned using added electrical components.

The conductor may be multiply connected and may exhibit bridges which allows arbitrary symmetries of the near field. These symmetries may be exploited for positioning purposes and for added accuracy of the alignment.

Arrays of resonant circuits may be used for accurate positioning purposes (Nonius method).

Generally, the predetermined value of the field coupling may be a measured (or determined) amplitude, transferred power, phase, phase delay, and/or signal runtime of the field coupling.

The field coupling may be expressed as an S parameter, a coupling parameter, a transfer impedance, a controlled source strength, a coupling coefficient, a mutual impedance, and/or a mutual inductance.

In one example predetermined value of the field coupling may be a predetermined coupling coefficient, e.g. of 0.01. Said coupling coefficient may be determined in voltage. For instance, in case the initial (free oscillating) resonant voltage is e.g. 500V, the predetermined value may correspond to 5V. Said initial resonant voltage may be caused by a first resonant circuit of a first object. Said predetermined value may be determined based on a measurement (in the example above the 5V) in the receiving circuit, i.e. a second resonant circuit of a second object.

A typical noise level may be approximately $1.0\ e^{-9}$. Transmission parameters S21 (scattering parameter) may be around 0.001 for a reflection around 0.99.

The attaching means may be configured such that the resonant circuits can be printed and/or etched on the objects (which are e.g. PCBs). Also other attaching means are possible. For example, they may comprise means for a frictional connection and/or means for a positive locking.

Aligning the objects may be done by using a multi-dimensional error minimization method, e.g. a largest gradient descent method.

Aligning the objects may include moving the resonant circuits in relation to each other, e.g. until the fields generated by the resonant circuits overlap in a predetermined manner, more in particular in predetermined regions of the resonant circuits.

At least one additional resonant circuit may be provided between the resonant circuits, the additional resonant circuit having at least one resonance frequency, wherein the additional resonant circuit is not connected to any external electronic circuit.

The step of aligning the objects may include: providing the objects as a stack arrangement, and/or aligning the objects pairwise, and/or aligning adjacent objects.

The objects may be electronic circuits.

Before the step of aligning the electronic circuits, the method may comprise the step of: electronically connecting the resonant circuit with the electronic circuit, e.g. by a non-resonant field coupling or a galvanic coupling.

The electronic connection may be removed after the step of aligning the resonant circuits.

The resonant circuits may be used as power transfer ports for transferring power between the electronic circuits after the step of aligning the resonant circuits has been performed.

The present disclosure further relates to an electronic alignment system for aligning objects, the alignment system comprising a set of resonant circuits, wherein each resonant circuits comprises: attaching means configured to attach the resonant circuit to an objects, and electronic connection means configured to connect the resonant circuit to an external electronic circuit, the resonant circuits having at least one resonant frequency and being configured to create a resonant field coupling between adjacent resonant circuits, wherein the resonant circuits are moveable in relation to each other such that the resonant field coupling reaches a predetermined value.

The resonant field coupling may be a capacitive coupling and/or an inductive coupling.

The electronic alignment system may further comprise at least one additional resonant circuit moveably arranged between the resonant circuits, the additional resonant circuit having at least one resonance frequency, wherein the additional resonant circuit comprises positioning means for being positioned between the resonant circuits.

The electronically connection means may be configured to connect the resonant circuit with the external electronic circuit by a non-resonant field coupling or a galvanic coupling, the non-resonant field coupling being e.g. removable.

Each resonant circuit may comprise: a coil system, e.g. in the form of a wire loop with a gap, in the form of dipole coils, in the form of St. Hans Cross knots or in the form of Guilloche figures, and/or a multiply connected system, e.g. based on Sierpinski gaskets, and/or an array of coils providing a Nonius scale.

The resonant circuits may comprise at least one electrical component, e.g. a capacitive and/or inductive element, configured to tune the resonance frequency.

The present disclosure further relates to an electronic circuit system comprising: a set of electronic circuits, and an electronic alignment system as described above.

Each electronic circuit may be provided with at least one resonant circuit, and the electronic circuits are configured to be alignable until a field coupling between the resonant circuits reaches a predetermined value.

A first electronic circuit may be configured to generate an electrical signal, a second electronic signal may be configured to detect the electrical signal, wherein the electrical signal is transmitted by the resonant circuits.

The electronic circuits may be the objects.

The electronic circuits may be stacked and the resonant circuits may be arranged on the electronic circuits to face each other.

The resonant circuit may be electronically connected with the at least one electronic circuit.

The present disclosure further relates to an object arrangement system comprising a set of alignable objects, and one of: an electronic alignment system as described above and an electronic circuit system as described above.

Each object may be provided with at least one electronic circuit or at least one resonant circuit, and the objects are configured to be alignable until a field coupling between the resonant circuits reaches a predetermined value.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
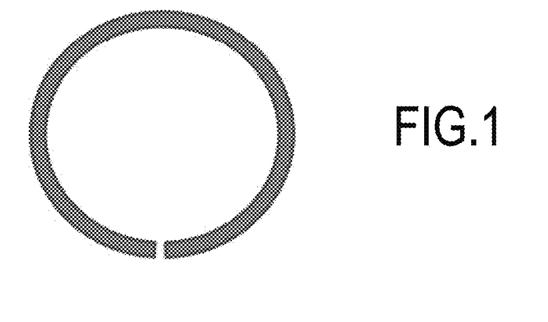
FIG. 1 shows a schematic representation of a resonant circuit consisting of a almost closed wire loop according to an embodiment of the present disclosure.

FIG. 1 shows a schematic representation of a resonant circuit consisting of a almost closed wire loop according to an embodiment of the present disclosure. The simplest resonant circuit 1 consists of a wire loop that is almost closed (c.f. FIG. 1). Such resonant circuits can be made on a printed circuit boards, it can be printed using conductive ink or plastic or be formed by a piece of suitable curved conductive material. The resonance frequency of this circuit is determined by the physical size of the gap (forming a capacitor) and by the area enclosed by the loop giving the inductivity of the circuit.

Figure 2:
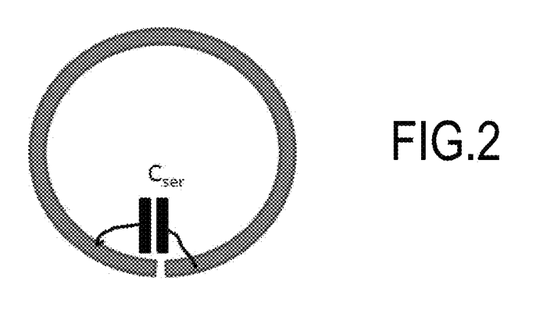
FIG. 2 shows a schematic representation of a resonant circuit of FIG. 1 with an added parallel capacitor according to an embodiment of the present disclosure.

FIG. 2 shows a schematic representation of a resonant circuit of FIG. 1 with an added parallel capacitor according to an embodiment of the present disclosure.

Figure 3:
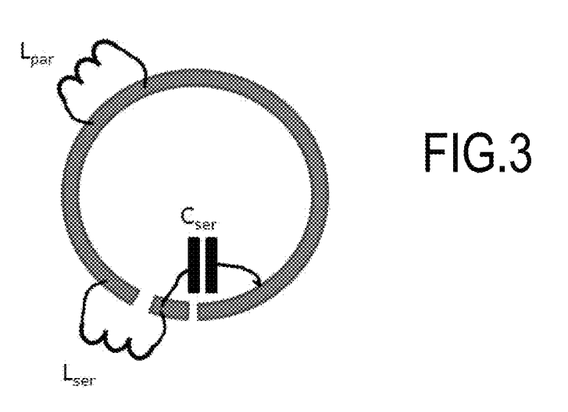
FIG. 3 shows a schematic representation of a resonant circuit of FIG. 1 with added parallel capacitor and inductors according to an embodiment of the present disclosure.

FIG. 3 shows a schematic representation of a resonant circuit of FIG. 1 with added parallel capacitor and inductors according to an embodiment of the present disclosure.

In order to adjust the resonance frequency of the circuit, one can add a lumped element capacitor parallel to the gap (increasing the capacity and lowering the frequency) or one can add lumped element inductors either parallel to parts of the wire loop or inserted as series elements in the wire loop. (c.f. FIGS. 2 and 3).

Figure 4:
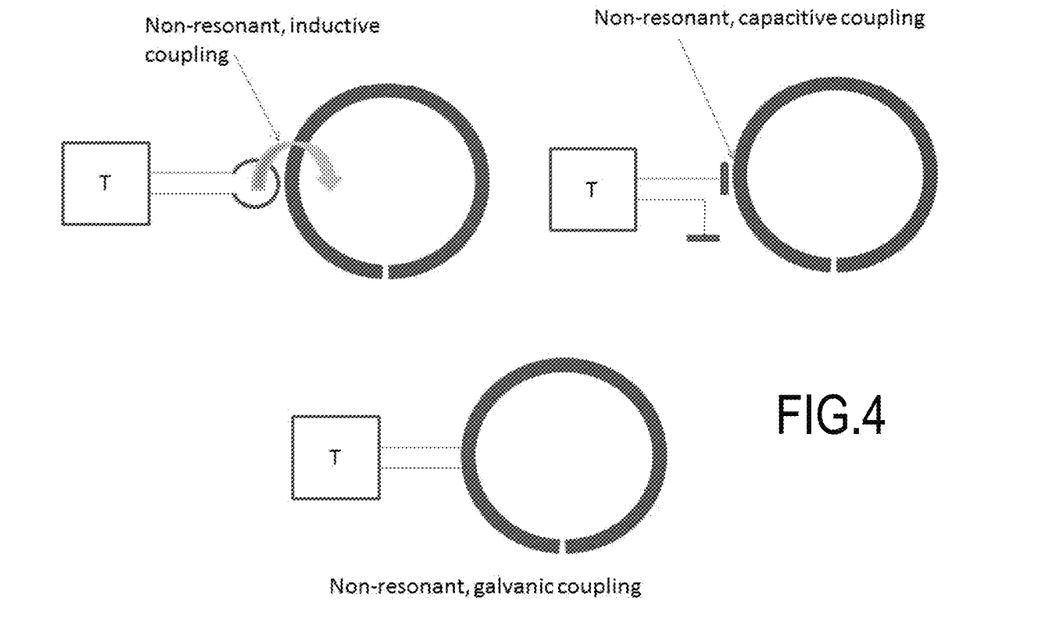
FIG. 4 shows schematic representations of coupling to external electronics according to an embodiment of the present disclosure: Inductive (top left) capacitive (top right) galvanically coupled (bottom)

FIG. 4 shows schematic representations of coupling to external electronics according to an embodiment of the present disclosure: Inductive (top left) capacitive (top right) galvanically coupled (bottom). In order to use these resonant circuits, they may be connected to external electronics being a transmitter or a receiver circuit. The coupling between the external electronics and the resonant circuit is done non-resonant. The coupling between is done by field coupling. This can be inductive (as indicated in FIG. 4, top left) but also capacitive (FIG. 4 top right) as well as galvanically coupled (FIG. 4 bottom).

In the following it is assumed that the optimum spatial alignment of the parts movable to each other coincides with the positioning leading to optimum electrical coupling of the circuits (plus a known mechanical displacement).

Figure 5:
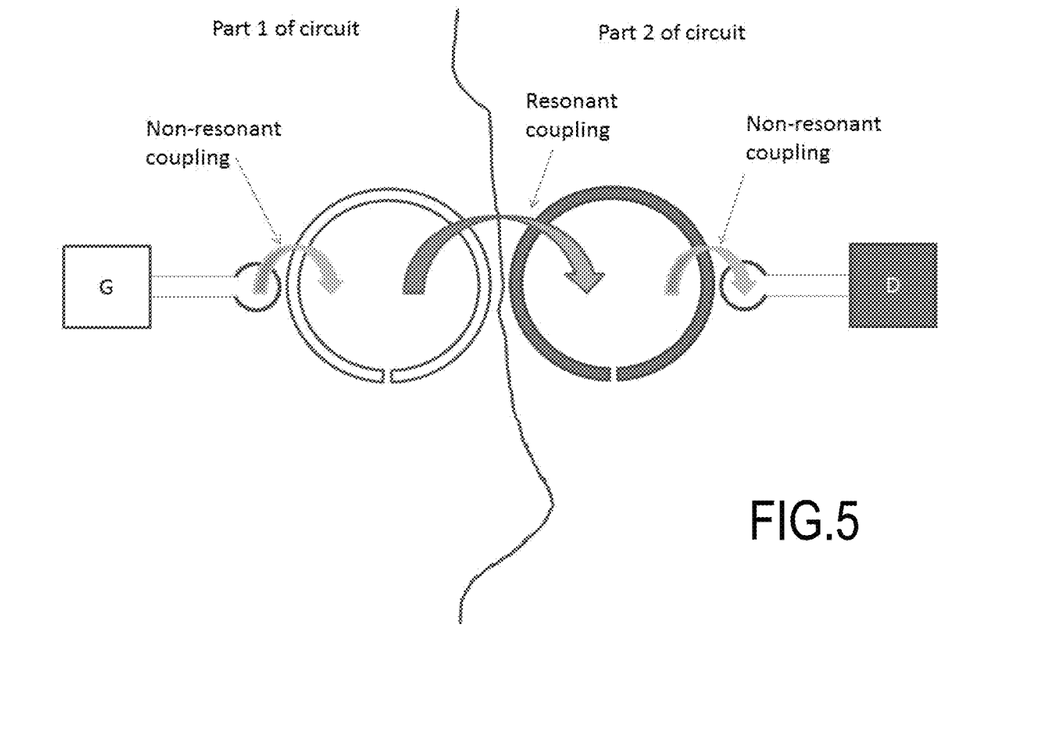
FIG. 5 shows a schematic representation of an "Active Target" coupling according to an embodiment of the present disclosure.

FIG. 5 shows a schematic representation of an "Active Target" coupling according to an embodiment of the present disclosure. In view of the forgoing embodiments, it is now placed one circuit on a first part of the system and couple it to a generator (G). On a second part of the system. Another resonant circuit with the same frequency is placed and coupled to a detector (D). Both parts of the system need to be spatially aligned.

The coupling between the two resonant circuits is strongest when both resonant circuits are placed on top of each other. At this point, alignment is reached. By moving one of the part of the system relative to each other, coupling is increased until it is maximized or a predetermined value is reached (e.g. voltage value, current value, power value, and/or other values characterizing the coupling efficiency between resonant circuits, as known from the art).

In order to achieve this task, a two-dimensional maximization method is used A largest gradient ascent method is suitable. This method is known in the Art.

The spatial resolution that can be easily reached using this method is about 10% of the diameter of the coil used. It depends on the noise level of the coupling measurement electronics. Since near fields are used, there is no need to have a coil of the size of half a wavelength associated with the resonance frequency. Practical reasons (sensitivity of measurement equipment) limit the minimum size of useful coils for a given frequency. As a rule of thumb, coil diameter should be chosen at 10% of the wavelength. Therefore reasonable resolutions are 1% of the wavelength used.

With a 24 GHz resonance, wavelength is about 1.2 cm, so 120 μm resolution is easily obtained and 12 μm is technically possible. With a 300 GHz resonance, 1 μm is feasible.

Figure 6:
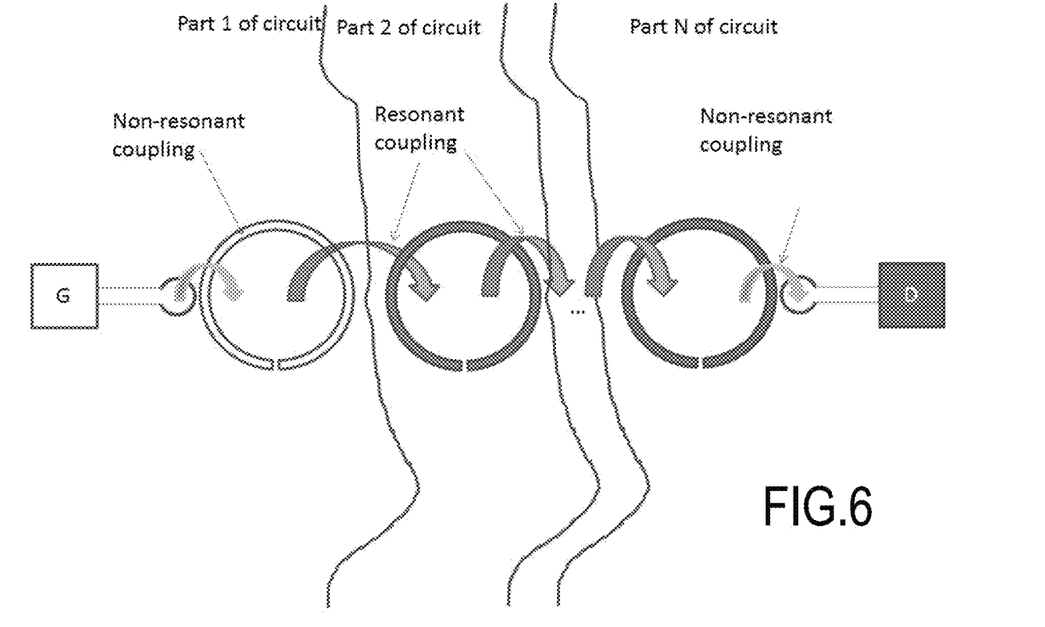
FIG. 6 shows a schematic representation of an "Multiple Target" coupling according to an embodiment of the present disclosure.

FIG. 6 shows a schematic representation of a "Multiple Target" coupling according to an embodiment of the present disclosure. As in Embodiment of FIG. 5, one circuit is placed on a first part of the system and coupled to a generator (G) (i.e. an electronic circuit). On at least one different part of the system another resonant circuit is placed. This circuit is not coupled to any further electronics. Said circuit is tuned to have the same resonant frequency as the first circuit.

On a third part of the system, another resonant circuit with the same frequency as all the others is placed. This circuit is coupled to a detector (D) (i.e. another electronic circuit).

All parts can now be aligned under the condition that there is some coupling between the resonant circuits from the first to the last circuits. As in Embodiment of FIG. 5 coupling through the chain of resonant circuits is strongest when all resonant circuits are placed on top of each other. At this point, alignment is reached. By moving parts of the system relative to each other, coupling is increased until it is maximized. In order to achieve this task, a multi-dimensional maximization method is used. A largest gradient ascent method is suitable. This method is known from the Art.

The alignment can be achieved by placing all internal layers out of coupling and optimizing according to the Embodiment of FIG. 5. Adding one internal layer one at a time, the process from Embodiment of FIG. 5 is repeated.

For each circuit that is coupled to the resonance chain, the measured resonance frequency changes considerably. By measuring the resonance chain's total resonance frequency it can be verified that all involved circuits are present. This resonance shift it is known from resonance circuits of the Prior Art.

Figure 7:
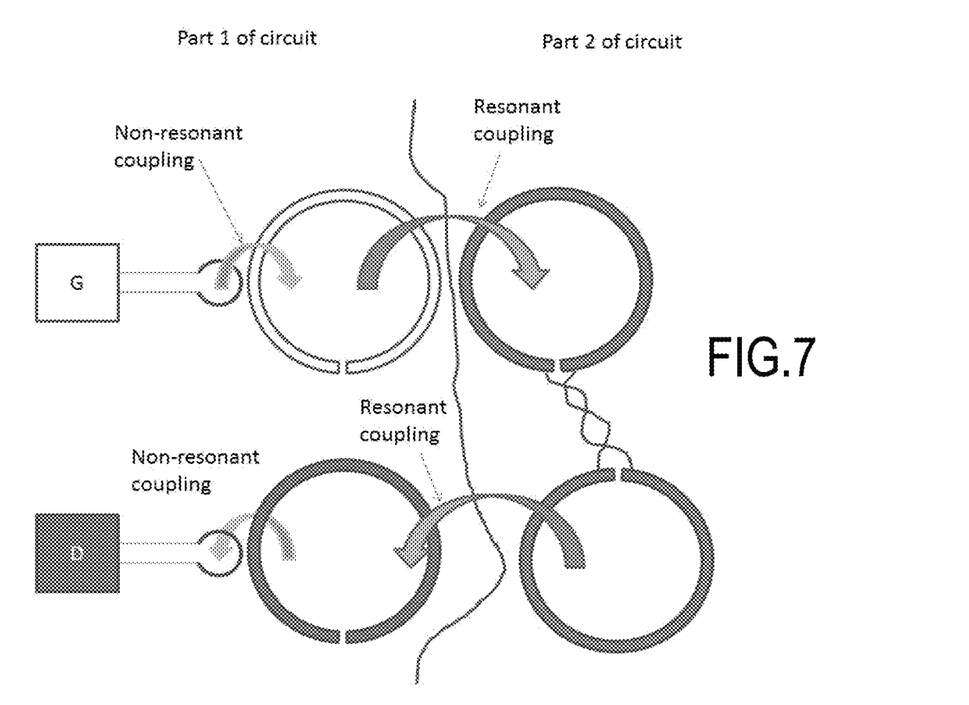
FIG. 7 shows a schematic representation of an "Passive Target" coupling according to an embodiment of the present disclosure.

FIG. 7 shows a schematic representation of a "Passive Target" coupling according to an embodiment of the present disclosure.

As in Embodiment of FIG. 5, one circuit is placed on a first part of the system and coupled to a generator (G). On at least one different part of the system another resonant circuit is placed. This circuit is not coupled to any further electronics. Said circuit is tuned to have the same resonant frequency as the first circuit. A second resonant circuit with the same frequency as the first one is placed on another location of the same part of the system. This circuit is coupled to a detector (D) on a second part of the system that is to be aligned to the first one, two resonance circuits are placed. Care is taken that the circuits are placed at the same relative distance as the two circuits on the first system.

These resonant circuits are coupled with each other using twisted line structures. These can be etched on PCBs or be made of wire structures. Important is that the twisting of the wires is done in a way that the surface area between the twists is much smaller than the surface of the resonant circuit.

Then, spatial alignment is reached when coupling between the first (generator coupled) and the last (detector coupled) circuits through the two circuits on the second part is optimum. The resonance frequency of the two resonant circuits coupled using twisted wires is tuned to the same frequency as the transmitter and receiver circuit. This is done by adding external elements.

A further benefit may be obtained by choosing one of the twisted-wire-coupled circuits larger (e.g. the lower right one in FIG. 7) than the other wire coupled circuit (e.g. upper right one in FIG. 7). All sizes of the other resonant circuits except the larger one are assumed identical. As soon as the circuit that is resonant coupled to the larger one is located completely within the larger circuit, its field coupling remains constant. Then only the coupling between the equally sized resonant circuits affects the coupling. This enables a separation from translational and rotational misalignments.

Figure 8:
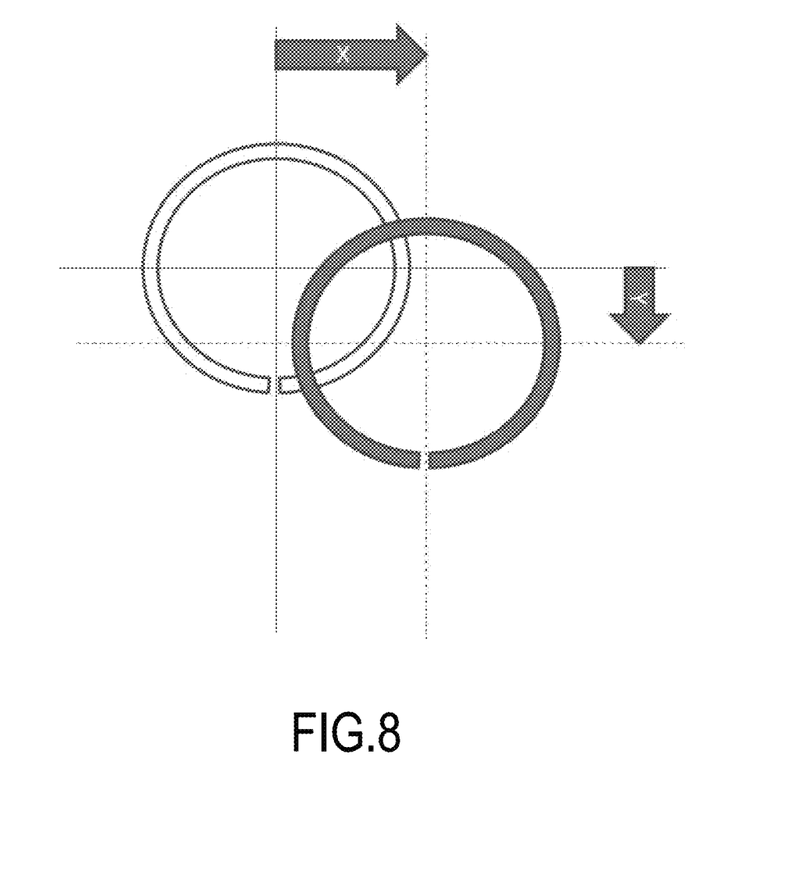
FIG. 8 shows a schematic representation of a coupling of circular resonances with displacement coordinates X and Y according to an embodiment of the present disclosure.

FIG. 8 shows a schematic representation of a coupling of circular resonances with displacement coordinates X and Y according to an embodiment of the present disclosure. Focusing on the resonant circuits alone, a displacement may be obtained in X and Y direction (c.f. FIG. 8). It is assumed that no alignment orthogonal to the resonant circuit's plane (Z direction) is required.

Figure 9:
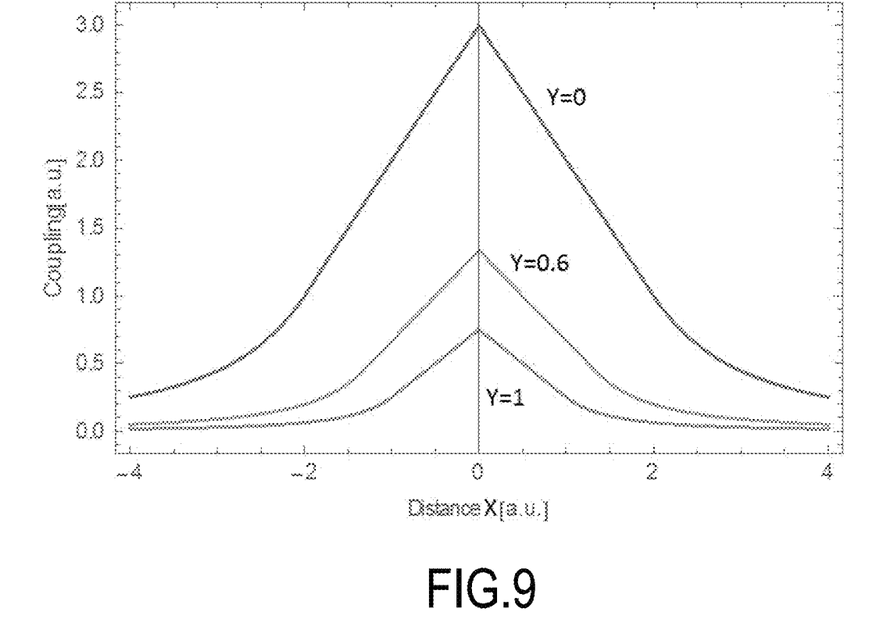
FIG. 9 shows a diagram of a coupling as a function of displacement coordinates according to an embodiment of the present disclosure.

FIG. 9 shows a diagram of a coupling as a function of displacement coordinates according to an embodiment of the present disclosure. For a given, small Z direction (small in this context is equivalent to "smaller than the resonance circuit size"), the obtained coupling is depicted in FIG. 9. The graphs show coupling as a function of the coupling in X-direction for a set of Y displacements. For Y=0, overlap is perfect and the alignment point is reached (c.f. blue curve in FIG. 9). For Y=0.6, coupling has still a maximum at X=0 but this maximum is lower than the maximum of the blue curve (c.f. yellow curve in FIG. 9). For an even larger Y, coupling is overall lower and the maximum is still available at X=0. (c.f. green curve in FIG. 9).

Figure 10:
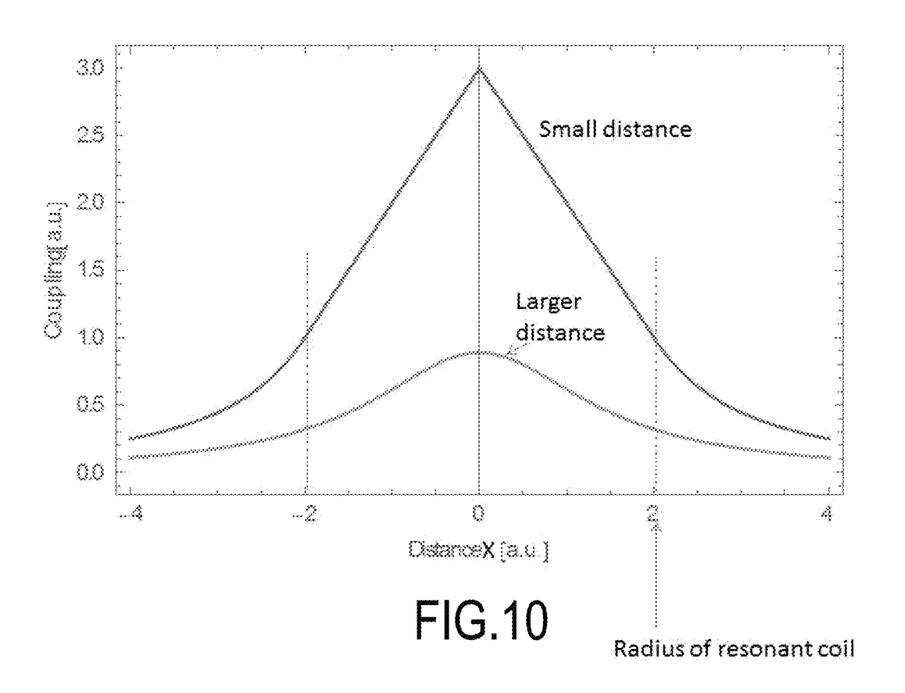
FIG. 10 shows a diagram of a coupling as a function of displacement coordinates with "Z"-distance between the circuits as parameter according to an embodiment of the present disclosure.

FIG. 10 shows a diagram of a coupling as a function of displacement coordinates with "Z"-distance between the circuits as parameter according to an embodiment of the present disclosure. For very small Z directions (close to 0, c.f. blue curve in FIG. 10), there are two distinct regions observable: In the case when the resonant coils overlap, coupling is linear. When the coils do not overlap, the coupling follows a power law. Nevertheless, the maximum coupling is reached as soon as the mechanical overlap is at maximum. The yellow curve in FIG. 10 is obtained when the distance Z is small but larger than in the above case. There the linear region is not observable any more since the field lines from the bottom coil are bent outward reducing coupling.

Figure 11:
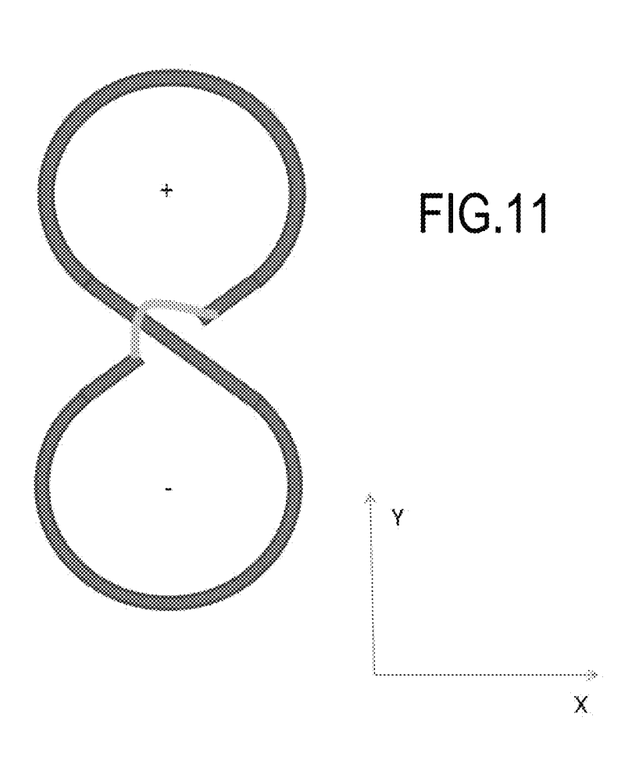
FIG. 11 shows a schematic representation of a dipole coil according to an embodiment of the present disclosure.

FIG. 11 shows a schematic representation of a dipole coil according to an embodiment of the present disclosure. The alignment accuracy is determined by the steepness of the change of coupling. Therefore, a different structure is chosen that provides steeper coupling changes. It is a dipole coil. In first order, the dipole coil in FIG. 11 exhibits a magnetic field is the Y-derivative of the magnetic field of a circular coil, the field in X direction changes sign for Y=0 but is in form not changed.

Figure 12:
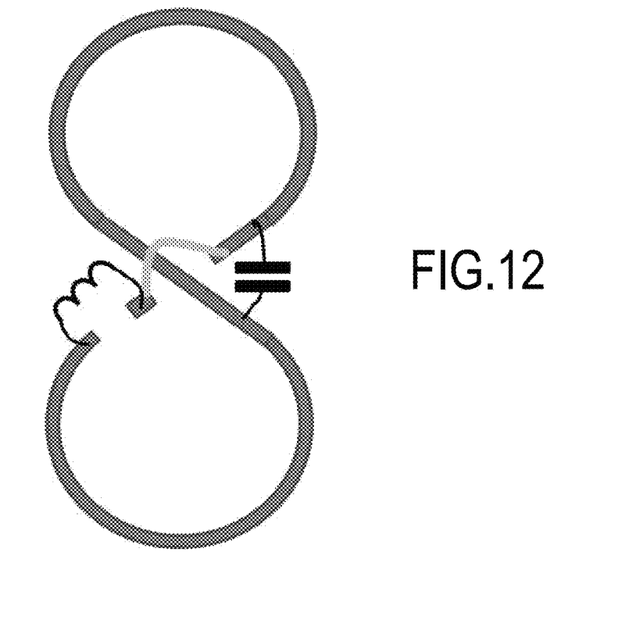
FIG. 12 shows a schematic representation of a tuned dipole coil according to an embodiment of the present disclosure.

FIG. 12 shows a schematic representation of a tuned dipole coil according to an embodiment of the present disclosure. FIG. 12 depicts how such a dipole coil (of. FIG. 11) can be tuned using parallel or serial components (similar to the circular coil).

Figure 13:
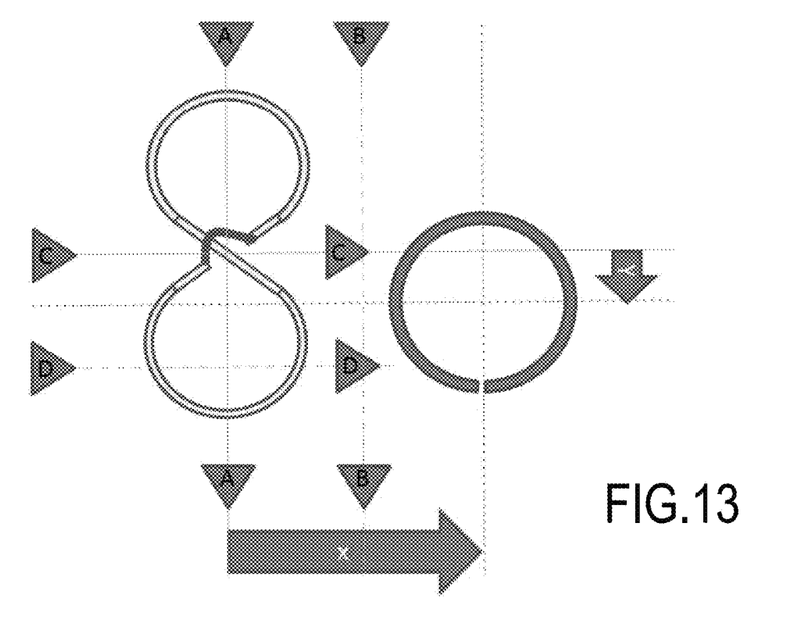
FIG. 13 shows a schematic representation of a coupling geometry between a dipole and a circular coil according to an embodiment of the present disclosure.
Figure 15:
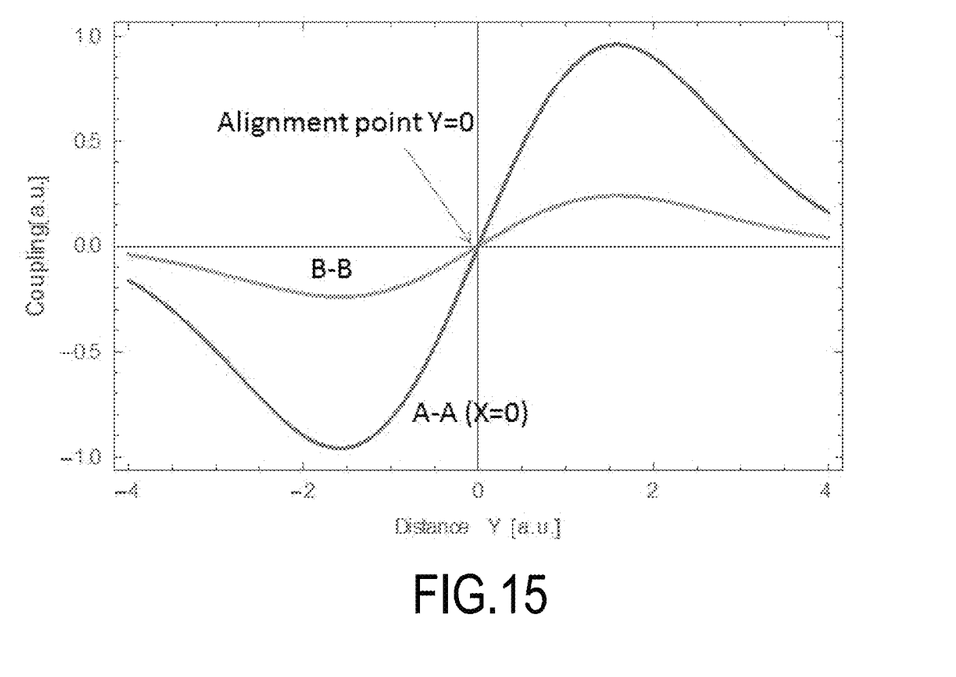
FIG. 15 shows a diagram of a coupling as a function of displacement between a dipole and a circular coil following Cuts A-A and B-B according to an embodiment of the present disclosure.

FIG. 13 shows a schematic representation of a coupling geometry between a dipole and a circular coil according to an embodiment of the present disclosure. FIG. 13 indicates the coupling situation when a dipole coil couples to a circular resonant coil. The obtained coupling following A-A is shown in FIG. 15, (blue curve). Due to complete field cancellation, coupling in the alignment point is identically zero. Following the line B-B one obtains a similar curve with less total coupling. Even here, no coupling is measured when the receiver coil is in the symmetry plane of the dipole coil (X=0).

Figure 16:
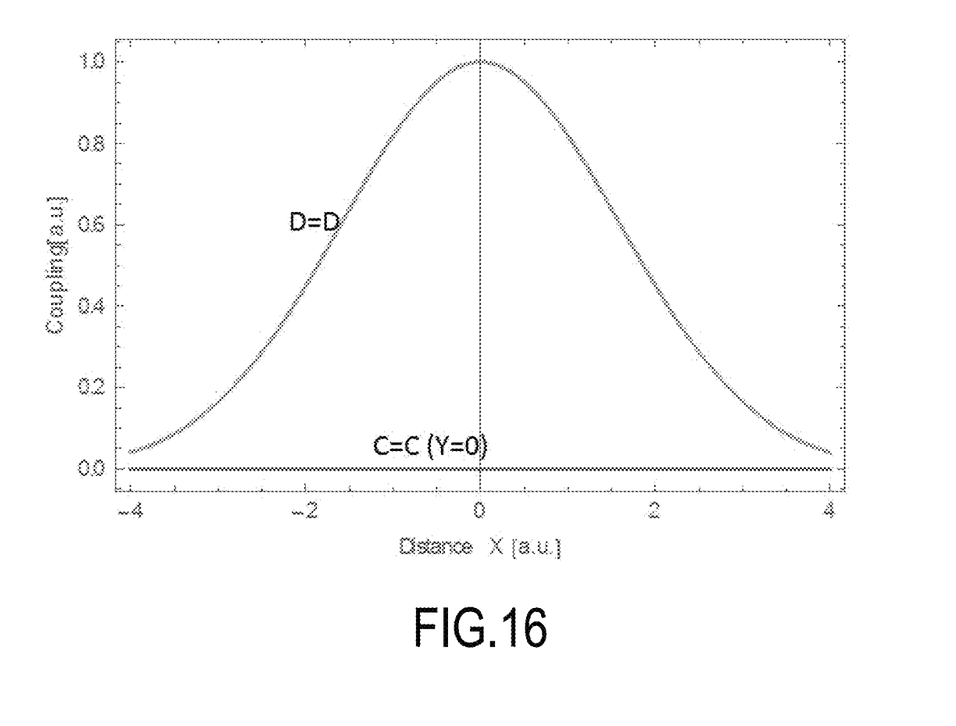
FIG. 16 shows a diagram of a coupling as a function of displacement between a dipole and a circular coil following Cuts C-C and D-D according to an embodiment of the present disclosure.

Moving the circular coil along the lines C-C, no coupling is achieved due to symmetry reasons. This is shown in FIG. 16. Outside the symmetry plane, some coupling is measured (D-D) and the behavior resembles to the circular-to-circular case.

Figure 14:
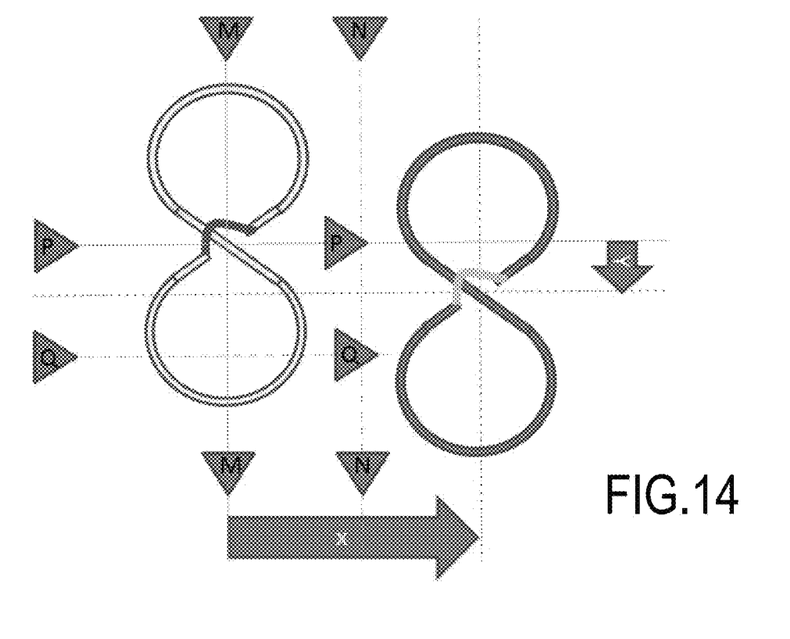
FIG. 14 shows a schematic representation of a coupling geometry between a dipole and another dipole coil according to an embodiment of the present disclosure.
Figure 17:
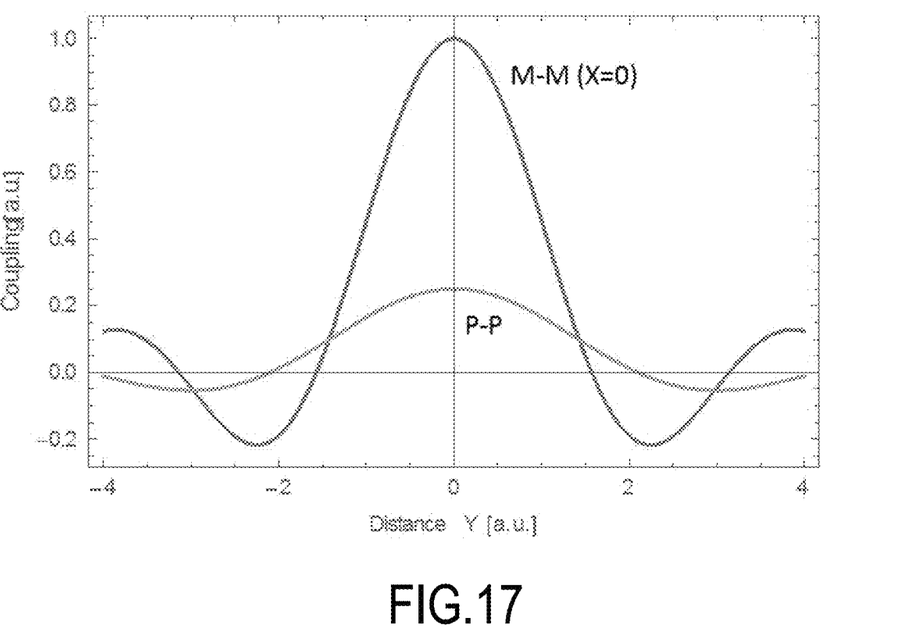
FIG. 17 shows a diagram of a coupling as a function of displacement between dipole coil following Cuts M-M and N-N according to an embodiment of the present disclosure.

FIG. 14 shows a schematic representation of a coupling geometry between a dipole and another dipole coil according to an embodiment of the present disclosure. FIG. 14 indicates the coupling situation when a dipole coil couples to another dipole coil. The obtained coupling following M-M is shown in FIG. 17, (blue curve). Due to complete field overlap, coupling in the alignment point is by orders of magnitude larger than anywhere else. Following the line N-N one obtains a similar curve with less total coupling. As in the circular-circular case, coupling is at maximum at closest overlap. The curves P-P and Q-Q are similar to the circular-circular case. It is noted that the dipole coil can be used to detect angular alignment problems as well. Coupling between two dipole coils crossed at 90 degrees will be zero at the point of alignment.

The added benefit of dipole coils is obvious when using pairs of them (orthogonally crossed), together with at least one circular coupling. Then the circular coupling is optimized to yield a rough approximation of the alignment point. Fine alignment and angular alignment is then obtained by nulling the higher order coils.

Any structure giving rise to a magnetic field when current is applied to it (serving as inductor) and that closed with at least one gap (serving as capacitor) may be used as resonant circuit. Some examples are described in the following in context of FIGS. 18 to 20.

Figure 18:
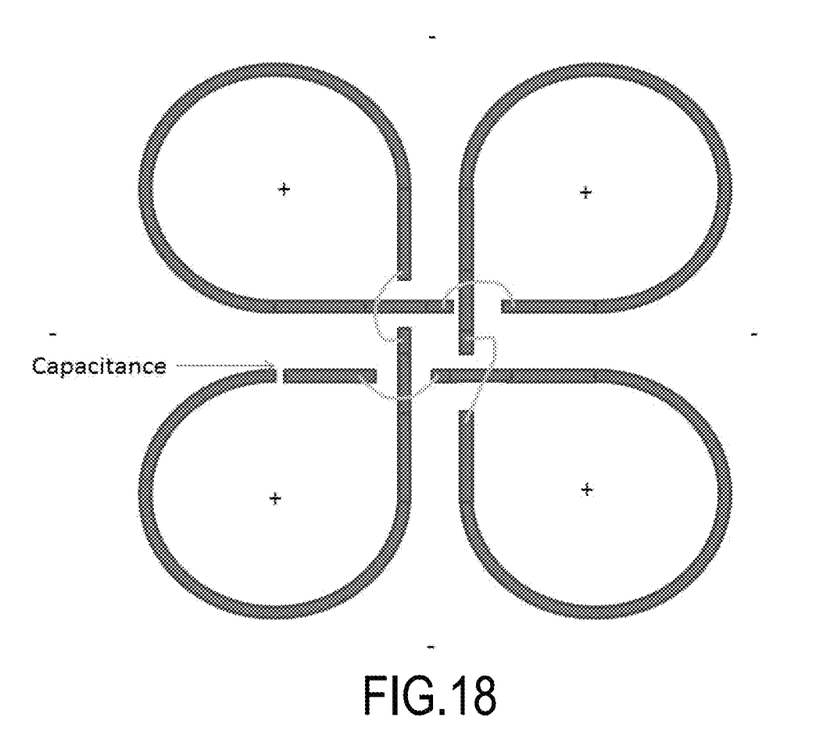
FIG. 18 shows a schematic representation of a St. Hans Knot coil according to an embodiment of the present disclosure.

FIG. 18 shows a schematic representation of a St. Hans Knot coil according to an embodiment of the present disclosure. As a special case, higher order coil structures may be devised (e.g. in the form of St. Hans Cross knots or in the form of Guilloche figures). These structures allow more than one symmetry plane with zero coupling (c.f. FIG. 18).

Figure 19:
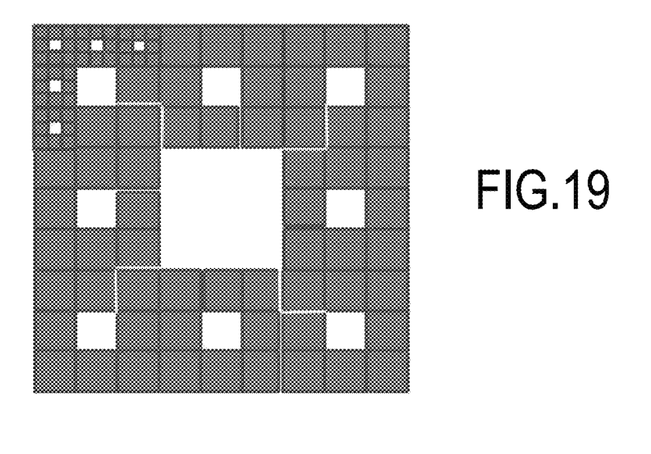
FIG. 19 shows a schematic representation of a Sierpinski coil according to an embodiment of the present disclosure.

As another special case multiply connected structures may be devised (e.g. based on Sierpinski gaskets, c.f. FIG. 19). FIG. 19 shows a schematic representation of a Sierpinski coil according to an embodiment of the present disclosure.

Figure 20:
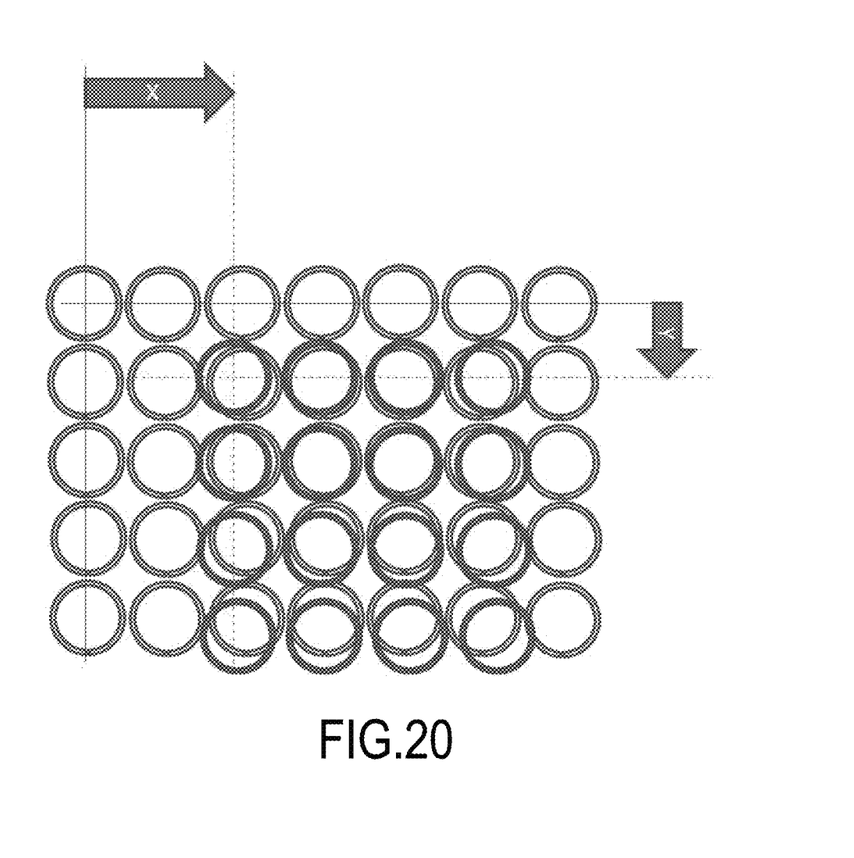
FIG. 20 shows a schematic representation of a Nonius coil array using 2D arrays with slightly different element spacing according to an embodiment of the present disclosure.

FIG. 20 shows a schematic representation of a Nonius coil array using 2D arrays with slightly different element spacing according to an embodiment of the present disclosure. Arrays of coils may be used in a Nonius scale to further increase the accuracy of alignment (c.f. FIG. 20) and for positioning purposes. Nonius scales allow alignment resolutions to be much smaller than the coil dimensions and about 0.1% of the wavelength associated with the applied frequency can be accomplished.

It is finally noted that the non-resonant coupling to external electronics may be made removable after alignment is performed.

Throughout the disclosure, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Furthermore the terms like "upper", "upmost", "lower" or "lowest" and suchlike are to be understood as functional terms which define the relation of the single elements to each other but not their absolute position.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A method of aligning a set of objects, the method comprising the steps of:
   attaching at least two resonant circuits to each object through etching or printing, wherein the at least two resonant circuits are coupled with each other using a twisted line structure;
   providing each object with at least two resonant circuits that are arranged in a horizontal direction, each of the resonant circuits having at least one resonance frequency, and
   aligning the objects that are stacked on top of each other in a vertical direction, in the horizontal direction until a field coupling between the resonant circuits reaches a predetermined value.

2. The method according to claim 1, wherein
   aligning the objects is done by using a multi-dimensional error minimization method, and a largest gradient descent method.

3. The method according to claim 1, wherein
   aligning the objects includes moving the resonant circuits in relation to each other, until fields generated by the resonant circuits overlap in a predetermined manner, in predetermined regions of the resonant circuits.

4. The method according to claim 1, wherein
   at least one additional resonant circuit is provided between the resonant circuits, the additional resonant circuit having at least one resonance frequency, wherein
   the additional resonant circuit is not connected to any external electronic circuit.

5. The method according to claim 1, wherein the objects are electronic circuits, and, before the step of aligning the electronic circuits, the method comprises the step of:
   electronically connecting the resonant circuits with the electronic circuits, by a non-resonant field coupling or a galvanic coupling.

6. The method according to claim 5, wherein the electronic connection is removed after the step of aligning the resonant circuits.

7. The method according to claim 5, wherein the resonant circuits are used as power transfer ports for transferring power between the electronic circuits after the step of aligning the resonant circuits has been performed.

8. An electronic alignment system for aligning a set of objects, the alignment system comprising a set of at least two resonant circuits, wherein each of the resonant circuits comprises:
   attaching means configured to attach the at least two resonant circuits to each object through printing or etching, wherein the at least two resonant circuits are coupled with each other using a twisted line structure, and
   electronic connection means configured to connect the resonant circuits to an external electronic circuit, each of the resonant circuits having at least one resonant frequency and being configured to create a resonant field coupling between adjacent resonant circuits, wherein the resonant circuits are moveable in relation to each other such that the resonant field coupling reaches a predetermined value,
   wherein the at least two resonant circuits attached to each object are arranged in a horizontal direction, and the objects are aligned on top of each other in a vertical direction.

9. The electronic alignment system of claim 8, wherein the resonant field coupling is at least one of a capacitive coupling and an inductive coupling.

10. The electronic alignment system according to claim 8, further comprising at least one additional resonant circuit moveably arranged between the resonant circuits, the additional resonant circuit having at least one resonance frequency, wherein the additional resonant circuit comprises positioning means for being positioned between the resonant circuits.

11. The electronic alignment system according to claim 8, wherein the electronic connection means is configured to connect the resonant circuits with the external electronic circuit by a non-resonant field coupling or a galvanic coupling, the non-resonant field coupling being removable.

12. The electronic alignment system according to claim 8, wherein each of the resonant circuits comprises at least one of:
   a coil system, in a form of a wire loop with a gap, in a form of dipole coils, in a form of St. Hans Cross knots or in a form of Guilloche figures,
   a multiply connected system, based on Sierpinski gaskets, and an array of coils providing a Nonius scale.

13. The electronic alignment system according to claim 8, wherein the resonant circuits comprise at least one electrical component, at least one of a capacitive and inductive element, configured to tune the resonance frequency.

14. The electronic alignment system according to claim 8, further comprising determining means configured to determine the resonant field coupling.

15. An electronic circuit system comprising:
   a set of electronic circuits, and
   an electronic alignment system according to claim 8.

16. The electronic circuit system according to claim 15, wherein
   each electronic circuit is provided with at least one resonant circuit, and
   the electronic circuits are configured to be alignable until the resonant field coupling between the resonant circuits reaches the predetermined value.

17. The electronic circuit system according to claim 15, wherein a first electronic circuit is configured to generate an electrical signal, a second electronic signal is configured to detect the electrical signal, wherein the electrical signal is transmitted by the resonant circuits.

18. The electronic circuit system of claim 15, wherein the electronic circuits are the objects.

19. The electronic circuit system of claim 18, wherein the electronic circuits are stacked and the resonant circuits are arranged on the electronic circuits to face each other.

20. The electronic circuit system of claim 15, wherein the at least one resonant circuit is electronically connected with at least one of the electronic circuits.

21. An object arrangement system comprising the set of the objects that are aligned with each other, and the electronic alignment system according to claim 8.

22. The object arrangement system according to claim 21, wherein
    each of the objects is provided with at least one electronic circuit or at least one of the resonant circuits, and
    the objects are configured to be alignable until the resonant field coupling between the resonant circuits reaches the predetermined value.

* * * * *